H. STEINHART.
REVERSING MECHANISM FOR ELECTRIC MOTORS.
APPLICATION FILED JUNE 4, 1914.
1,133,675.
Patented Mar. 30, 1915.
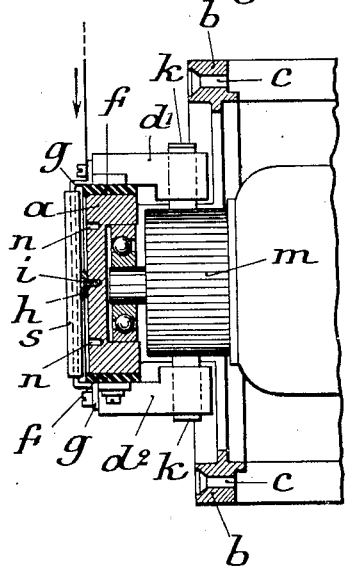
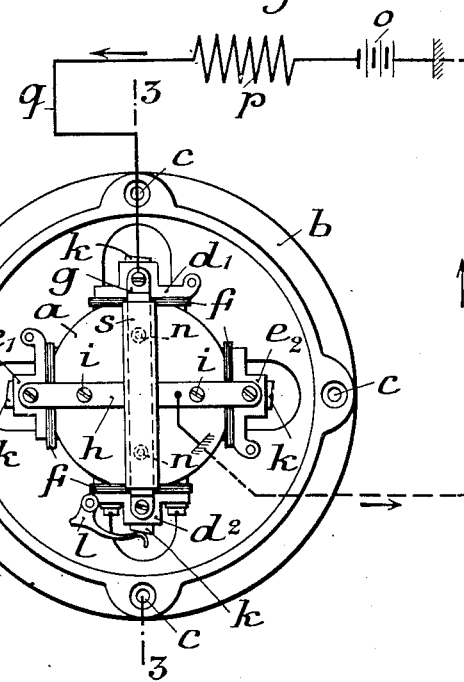
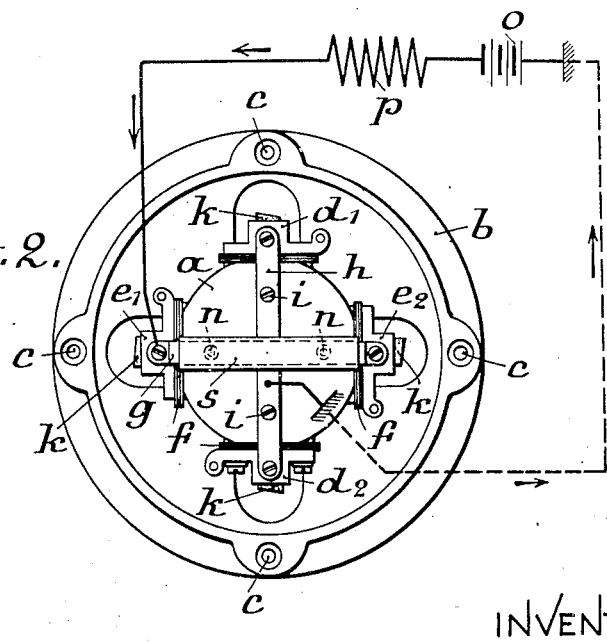
WITNESSES
INVENTOR
Hermann Steinhart

UNITED STATES PATENT OFFICE.

HERMANN STEINHART, OF STUTTGART, GERMANY, ASSIGNOR TO THE FIRM OF ROBERT BOSCH, OF STUTTGART, GERMANY, A CORPORATION OF GERMANY.

REVERSING MECHANISM FOR ELECTRIC MOTORS.

1,133,675.

Specification of Letters Patent.

Patented Mar. 30, 1915.

Application filed June 4, 1914. Serial No. 842,818.

*To all whom it may concern:*

Be it known that I, HERMANN STEINHART, a subject of the Emperor of Germany, residing at and whose post-office address is Lerchenstrasse 74, Stuttgart, Germany, have invented certain new and useful Improvements in Reversing Mechanism for Electric Motors; and I do hereby declare the following to be a full, clear, and exact description of the invention, such as will enable others skilled in the art to which it appertains, to make and use the same.

The object of the present invention is to provide a mechanism for reversing the direction of rotation of an electric motor of the series type having one brush per pole and having one terminal grounded. Prior arrangements for this purpose are cumbersome in that the means for changing the connections of the armature circuit relatively to the field circuit to reverse the motor, involve considerable manipulation and some skill, as, for instance, where it is necessary to rotate the brush holders with their connecting leads through a polar space, or where it is necessary to disconnect the leads and then connect them in reverse order. In accordance with my invention, the procedure for reversing the motor is simplified and the possibility of error is eliminated as a practical matter. In the preferred embodiment of the invention, I provide a supporting member fastened to the frame of the motor, and on which all of the brush holders are mounted in such manner as to be insulated therefrom. One conducting member is disengageably fastened to the brush holders of one polarity and to the field winding, but is insulated from the supporting member; while a second conducting member is disengageably fastened to the brush holders of opposite polarity and also to the supporting member to ground that terminal of the motor. These two conducting members are interchangeable, and the only operation required to reverse the direction of rotation of the motor is to change those members in position so that each one becomes fastened to those brush holders which were previously fastened to the other one.

In the accompanying drawings, illustrating this preferred embodiment of my invention in application to a direct current four-pole motor, as an example, and in which the electrical connections are indicated diagrammatically, Figure 1 represents a side view of the motor showing reversing mechanism arranged for one direction of rotation; Fig. 2 represents a similar view but showing the reversing mechanism arranged for the opposite direction of rotation; and Fig. 3 represents a partial section on line 3—3 of Fig. 1.

The supporting member $a$ of the metal is cast in one piece, and is arranged to be carried by an end frame fastened to the field structure $b$ at the places $c$. The supporting member is provided with four screw threaded holes $n$ and the two diametrically-disposed slots as shown. The pairs of brush holders $d_1$, $d_2$ and $e_1$, $e_2$ are mounted on the supporting member $a$, but are insulated therefrom by the insulation $f$, the brushes $k$ being held against the commutator $m$ by spring fingers such as $l$ shown in Fig. 1.

In Fig. 1, the brush holders $d_1$, $d_2$ are of positive polarity and are fastened by screws to the bar $g$ of metal, which is insulated from the supporting member by the sleeve $s$ of insulating material. The conductor $q$ connects a terminal of a series field winding $p$ to the bar and thus to the two brushes $k$ in the brush holders $d_1$, $d_2$. The bar $h$ of metal is fastened by screws to the negative brush holders $e_1$, $e_2$ and is also fastened in the diametrically-disposed slot of the supporting member $a$ by the screws $i$, thereby grounding these brushes on the frame of the machine. In Fig. 2, the bars $g$ and $h$ are interchanged, the brush holders $e_1$ and $e_2$ then being connected by conductor $q$ and bar $g$ to the field winding and being insulated from the supporting member $a$, whereas the brush holders $d_1$ and $d_2$ are grounded on the supporting member $a$ by the bar $h$ fastened thereto.

In Fig. 1, the current flows from a source of current, as the battery $o$, through the series field winding $p$ of the motor and the conductor $q$ to the insulated conducting member $g$, from which the current enters the armature winding at the positive brushes in the brush holders $d_1$, $d_2$. The current leaves the armature winding through the brushes into negative brush holders $e_1$, $e_2$ and passes through the bar $h$ into the grounded supporting member $a$ which is electrically connected to the negative terminal of the battery. When current is supplied to the motor in this wise, the armature rotates in a certain direction, but when the conducting members $g$ and $h$ are interchanged, as shown in Fig. 2, the current enters the armature winding at the brushes in the brush holders $e_1$, $e_2$, and leaves by way of the brushes in the brush holders $d_1$, $d_2$, and the direction of rotation of the motor is reversed, since the direction of the flow of current through the field winding remains unchanged.

For motors of more than four poles, the brush holders of like polarity, are, in accordance with this invention, electrically connected by a group of rails instead of a single rail, or by any other suitable conducting member.

Having thus described my invention, what I claim is:

1. In a multipolar motor of the series type, a reversing mechanism comprising a plurality of insulated brush holders equal in number to the number of poles in the motor, an insulated conducting member electrically connected to the brush holders of one polarity, and a grounded conducting member electrically connected to the brush holders of opposite polarity, said conducting members being interchangeable to reverse the direction of rotation of the motor.

2. In a multipolar motor of the series type, a reversing mechanism comprising a grounded supporting member, a plurality of brush holders supported by but insulated from the supporting member and being equal in number to the number of poles in the motor, a conducting member electrically connected to the brush holders of one polarity and insulated from the supporting member, and a second conducting member electrically connected to the brush holders of opposite polarity and to the supporting member, said conducting members being interchangeable to reverse the direction of rotation of the motor.

3. In a multipolar motor of the series type, a reversing mechanism comprising a grounded supporting member, a plurality of brush holders supported by but insulated from the supporting member and being equal in number to the number of poles in the motor, a conducting member electrically connected to the brush holders of one polarity by disengageable fastening devices and also being electrically connected to one terminal of the field winding, but being insulated from the supporting member, and a second conducting member electrically connected by disengageable fastening devices to the brush holders of opposite polarity and also to the supporting member, said conducting members being interchangeable to reverse the direction of rotation of the motor.

In testimony whereof I affix my signature, in presence of two witnesses.

HERMANN STEINHART.

Witnesses:
PAUL WOLFART,
REINHOLD ELWERT.